United States Patent [19]

Schatton et al.

[11] 4,009,893
[45] Mar. 1, 1977

[54] TUBING OR CASING JOINT

[75] Inventors: Paul Schatton, Dusseldorf;
Wolfgang Hellmund, Viersen, both of Germany

[73] Assignee: Mannesmannrohren-Werke AG, Dusseldorf, Germany

[22] Filed: Sept. 29, 1975

[21] Appl. No.: 617,795

[30] Foreign Application Priority Data

Sept. 27, 1974 Germany ............................ 2446783
Dec. 3, 1974 Germany ............................ 2457541

[52] U.S. Cl. .............................. 285/110; 285/332.3;
285/334
[51] Int. Cl.² ........................................... F16L 15/00
[58] Field of Search .......... 285/334, 333, 110, 219,
285/212, 332.3, 355

[56] References Cited

UNITED STATES PATENTS

| | | | |
|---|---|---|---|
| 2,006,520 | 7/1935 | Stone et al. | 285/334 |
| 2,239,942 | 4/1941 | Stone et al. | 285/110 |
| 2,746,486 | 5/1956 | Gratzmuller | 285/110 X |
| 2,992,019 | 7/1961 | MacArthur | 285/334 X |
| 3,100,656 | 8/1963 | MacArthur | 285/333 X |
| 3,145,035 | 8/1964 | Hanback | 285/212 X |
| 3,850,456 | 11/1974 | Hanback et al. | 285/212 X |
| 3,856,337 | 12/1974 | Ehm et al. | 285/334 |

*Primary Examiner*—Thomas F. Callaghan
*Attorney, Agent, or Firm*—Ralf H. Siegemund

[57] ABSTRACT

Box and pin members have two axially spaced thread sections being separated by a radial step zone which includes, for one member e.g. the pin member, an annulus having an axial undercut, a frusto-conical end face and a radially outwardly bulging peripheral surface, which sealingly engages a slightly contoured inner surface of the box member in the step zone, while the end face of the annulus bears against a complementary face in the step zone of the box member. These stop faces supplement complementary thread stop faces respectively at the end of the pin member and in the box member. In a second example, the end face of the annulus is spaced from the box member and the flange of sealing sleeve is interposed, while the sleeve itself is situated in the undercut.

7 Claims, 2 Drawing Figures

TUBING OR CASING JOINT

BACKGROUND OF THE INVENTION

The present invention relates to a casing joint, particularly between a box member and a pin member with complementary threads. More particularly, the invention relates to a joint construction wherein the threaded portion of each member is divided in two axially spaced portions or thread sections with a transition zone in between. Since the two thread sections are of different diameters, a radial step is provided in that transition zone.

Casing joints for oil field equipment are known in great abundance and variety. The principal problem here is to provide a tight seal between the casing members combined with definite stops for limiting threading as the joint is made up. U.S. Pat. Nos. 2,211,179, 2,992,019, 3,100,650 and 3,359,013 are but examples for this state of the art.

Problems still exist in that the known joints do not provide for a satisfactory combination of sealing and stop functions particularly in those instances, in which multiple seals are needed. This is particularly so if one wants to avoid extremely accurate manufacturing tolerances with regard to the spacings between different sets of engaging surface portions, shoulders, end faces, etc. Also, individual matching of box and pin members which will make up the joint is not only very cumbersome, but impractical. The casing members should be used interchangeably and, possibly, repeatedly and in different combinations.

DESCRIPTION OF THE INVENTION

It is an object of the present invention to provide for a new and improved casing joint, which permits inherent compensation of tolerances.

It is another object of the present invention to provide for specific, synergystic combination of sealing and stop functions in casing joints.

It is a further object of the present invention to provide for a new and improved casing joint structure which includes multiple, spaced apart sealing and/or thread stop locations.

It is a specific object of the present invention to provide for a new structure in a casing joint as between a box member and pin member and involving the radial step between two axially spaced thread sections of different diameter.

In accordance with the preferred embodiment of the present invention it is suggested to provide an annular axial extension of one of the members in the step zone and having an axially extending undercut or recess of annular configuration, open towards the step in the respective other member, and at least one portion of the surface of that annular extension coacts with surface portions of the other member in the step zone to obtain sealing and/or stop functions.

In the preferred form of practicing the invention both functions are obtained by the same structure and in both instances these functions are based on resilient deflection of the annulus. The sealing function is preferably obtained by providing the peripheral surface of the annulus with a bulging contour facing radially a surface portion of the other member in the step zone and coacting with a non-complementary, bulging or conical contour of that surface portion of the other member. The stop function (limiting the threading of the pin member into the box member when the joint is made up) is preferably provided by engagement of a shallow, frusto-conical axial end face or shoulder of the annulus and of a complementary face or shoulder in the radial step zone of the other member. Cooperation as between sealing and stop functions is provided in that upon mutual engagement of the step shoulders the bulging contour rolls on the coating surface portion of the other member due to resiliency of the annulus. As an alternative to the stop function, a space is provided between the axial end face of the annulus and the closest (axial) surface portion of the other member in the step zone, and a resilient flange is interposed here for sealing; the flange extends from a sleeve which is received by and held in the undercut recess.

The invention will find particular utility in those instances, in which a stop surface or stop shoulder is provided at the inner end of the pin member and coacts with a complementary stop surface or stop shoulder in the box member. As these shoulders engage, any tolerances become noticeable in the step zone. The step zone when constructed as per this invention will readily take up these tolerances and provide for complete compensation. This way, multiple axially spaced sealing and/or thread stop functions are fully obtained in each instance.

DESCRIPTION OF THE DRAWING

While the specification concludes with claims particulary pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
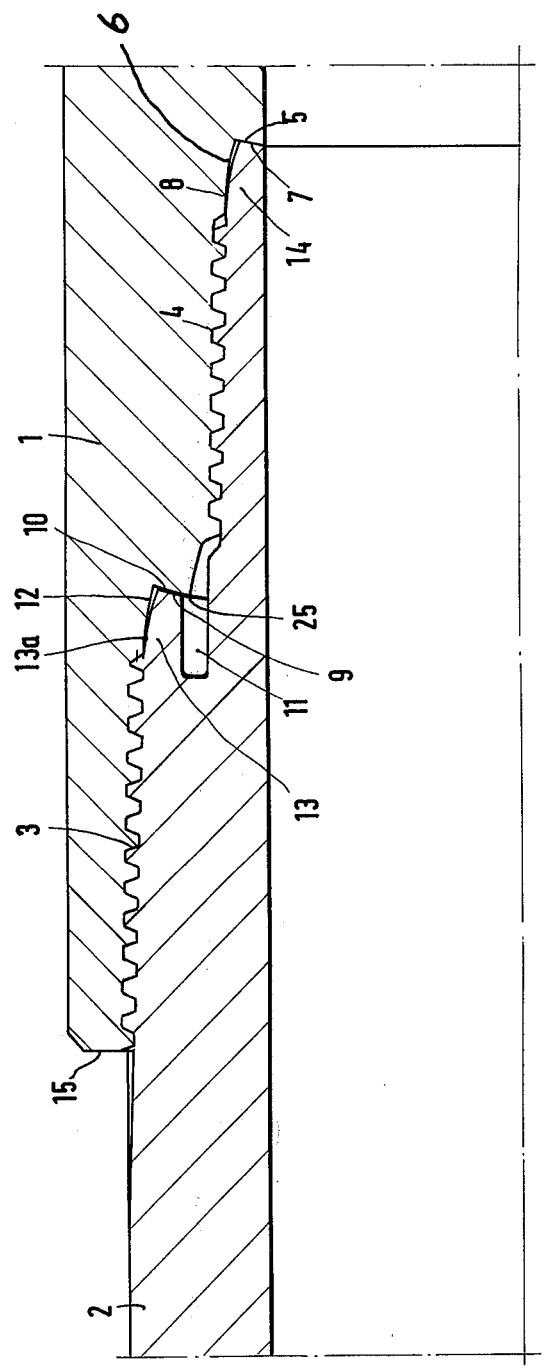
FIG. 1 is a section of a casing joint in accordance with the preferred embodiment of the invention.

Proceeding now to the detailed description of the drawings, the figures show two casings of which 1 is a box member or socket tube being connected to the second casing which is a pin member 2 for this particular joint. The connection and joint is made through two complementary threaded sections 3 and 4, each being of slightly tapered configuration. Each of the box and pin members is provided to accommodate an inner terminal zone located beyond threading section 4, and a transition zone between the two sections 3 and 4.

The inner terminal zone is established, as far as the box member 1 is concerned, by a slightly tapered bore 6, and terminates in a stop surface, shoulder or end face 5, which is of very shallow, frusto-conical configuration. The pin member 2 has an end pin 14 with a shoulder and axial end face 7 of frusto-conical configuration and being complementary to surface 5. The pin has also a bulging convexity 8 at its periphery engaging the bore 6. The side wall of that tapered bore 6 could be slightly concave, conical or even slightly convex to establish a seal of the type disclosed in U.S. Pat. No. 3,856,337. In any event, the engaging surfaces are non complementary.

Upon mutual engagement of end faces or stop shoulders 5 and 7, further threaded insertion of the pin member 2 in the box member 1 is impeded. In addition, the engagement of these end faces 5 and 7 supplements and supports the sealing as provided between bore 6 and annular convexity 8 (see said U.S. Pat. No. 3,856,337).

Turning now to the transition zone between the two threaded sections 3 and 4, this zone generally provides for a radial step as between the larger diameter of outer thread section 3 and the smaller diameter of inner thread section 4. Box member 1 has another abutment surface or stop shoulder 10 in that the step zone being also of frusto-conical configuration with a shallow apex angle of the corresponding cone. The apex angle of that cone is between 120° and 160° corresponding to an angle between the generatrix and the axis of casing 2 of 60° to 80° (which in turn corresponds to an angle from 30° to 10° between that generatrix and a plane which extends at right angles to the axis of the casing, or casings after the joint is made up).

Thus, surface or shoulder 10 pertains to a step and actually establishes the main radial step in the step zone and as such bounds, on the large diameter side, a tapered surface 12. That surface 12 extends from the threading of section 3 as pertaining to box member 1, to stop shoulder 10. Tapered surface 12 has also a conical, convex or concave contour as seen in the plane of the drawing. On the small diameter side of surface 10, a taper provides for transition proper from this step to threading section 4.

The pin member 2 is provided with an annular extension 13, which is bounded on the outside by a bulging convexity 13a, which is not complementary to surface 12, so that they will not lock in broad surface to surface engagement. Annulus 13 extends from the threading of section 3 as pertaining to pin member 2 to a frusto-conical surface or shoulder 9, which is an axial end face of annulus 13 and is of complementary contour in relation to surface 10, cooperating therewith as second stop as far as the pin member 2 is concerned. One can also say that annular stop surface 10 is of overall convex contour (with radial symmetry to the axis of the casing), and stop surface 9 is complementarily concave.

The annular extension 13 is on the radial inside bounded by a recess 11 or undercut in form of an annular cavity which, together with the annular extension 13, completes the step as far as pin member 2 is concerned and continues as to its radial inner boundary in a slightly tapered surface portion which extends to the threading of pin member 2 as pertaining to section 4.

The undercut-like configuration of this step provides for greater resiliency as far as the stop and limit action of coacting surfaces and shoulders 9 and 10 are concerned, than the coaction between innermost end stop shoulders 5 and 7 can possibly provide. Thus, stop shoulders 5 and 7 when engaging, positively stop further threading and relative turning of the box and pin members. Any tolerances with regard to the relative disposition of shoulders 9 and 10 on pin member 2 to the others on member 1 are taken up by resiliency of annulus 13, thereby synergistically providing for the sealing by metal to metal engagement of radial surfaces 13a and 12.

The surfaces 9 and 10 may abut directly upon completion of threading pin member 2 into socket or box member 1. However, it is advisable to interpose a flat annulus 25, which has particularly good sliding properties on steel, for example, polyfluorethylene (e.g. Teflon). Such a disk augments and facilities sliding of surfaces 9 and 10, which upon using such a disk 25 will not slide directly on each other, but on the disk 25. This sliding function is needed to accommodate the resilient yielding of annulus 13 in the very last phases of threading.

It should be mentioned for purposes of completion that a metallic sealing connection may be provided at end 15 of box member 1 using a frusto-conical surface abutting against a corresponding shoulder or pin member. Such a seal would be analogous to the sealing by surfaces and shoulders 5 and 7.

It should be mentioned further that analogously the annulus may be provided on the box member, whereby the undercut recess, analogous to 11, would be situated more radially outwardly. One can readily understand this exchange simply be assuming that the axis (indicated by dash dot line along the bottom of FIG. 1) is situated on top of the Figure instead; and 1 would be the pin member and 2 the box member. The pin end seal (6 to 8) as shown is thus readily understandably also an outer seal plus stop simply by relocating the axis in the manner indicated.

The stop surfaces and shoulders 5, 10 and 7, 9 limit the threading of pin member 2 into box member 1 generally. The surface 9 is part of an element (13) which is more elastic than any of the other back portions of the several stop surfaces. As stated, this resiliency offsets some tolerances here. The annulus 13 undergoes elastic bending upon tightening of surface 9 against surface 10. This bending generally reinforces and supports the sealing of bulging convexity 13a against surface 12. The undercut and recess 11 does not establish a weakening of the overall load bearing characteristics of the pipe because of the overlap of pin and box members in the joint region. Moreover, the undercut and recess 11 does not reduce the pipe wall structure below the wall thickness prevalent in threading section 4.

For a particularly effective connection, the distance of stop surfaces and shoulders 5 and 10 of box member 1 should be a little larger than the distance between the complementary surfaces and shoulders 7 and 9 on pin member 2. This difference should be in addition to the difference inherently needed to accommodate the disk 25. The differences in distances should be of the same order as the tolerances. Upon threading casing 2 into casing 1, it is inevitable then that shoulder surface 9 hits (engages) shoulder surface 10 (with disk annulus 25 interposed) before shoulder surface 7 meets shoulder surface 5. As threading action continues, annulus 13 is radially widened, and actually the bulge 13a rolls on the contoured wall 2 of and in box member 1, until the engagement of shoulder surfaces 7 and 5, which adds to the stop action between surfaces 9 and 10 and raises the overall effective resistance against further threading beyond the selected and adjusted limit.

It should be noted that the casing joint can readily be released and reconnection of e.g. the box member 1 with another pin member will still produce a tightly sealed joint. This is so, because the elastic recoil action of annulus 13 of the previous casing 2 is larger than the elastic upsetting of the material at the box member's stop surfaces 5 and 10. On the other hand, the resilient deformation of annulus 13 as a whole of the unscrewed member is a reversible one.

The construction and here particularly the provision of several, axially spaced apart metal to metal seals in accordance with the features of the invention permits re-use in that the sealing property is retained and maintained even after threading the several members together for several times and even if the casing members so joint are different ones each time.

Figure 2:
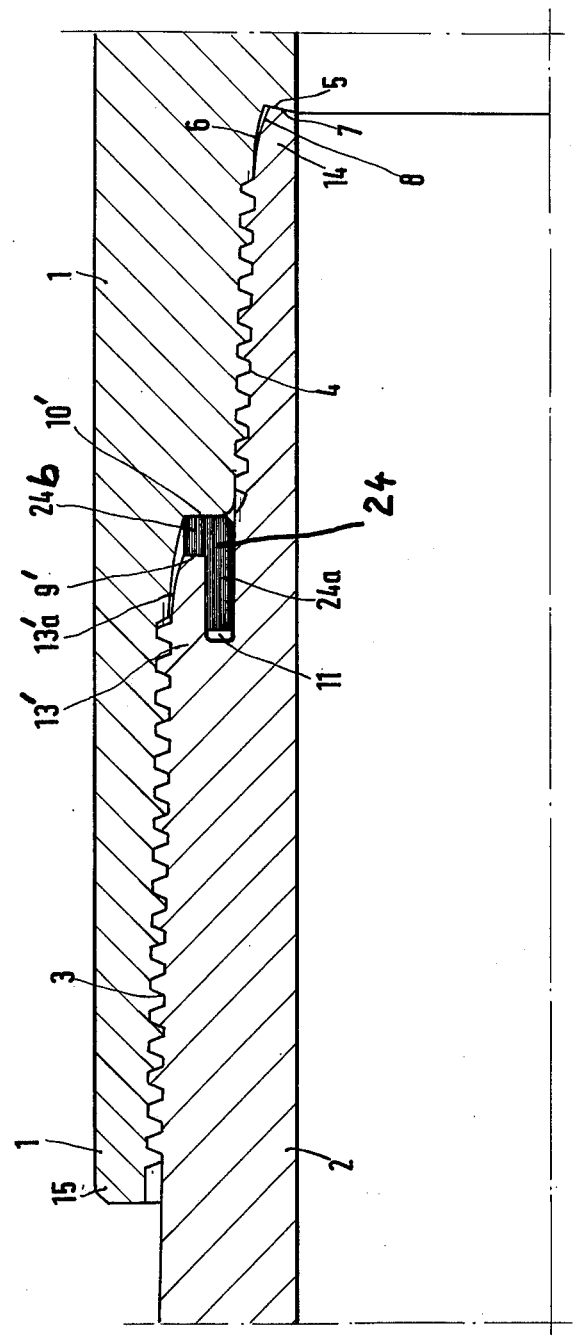
FIG. 2 is a section illustrating a second example of a casing joint in accordance with the preferred embodiment.

The example of FIG. 2 has box and pin members 1 and 2, two threading sections 3 and 4 and internal sealing parts 5 through 8 and 14 as shown and explained already with reference to FIG. 1. However, thread section 4 is longer than thread section 3. Also, the sealing and step zone between sections 3 and 4 is constructed differently. The steps as far as the box member 1 is concerned is defined by an annular surface 10', which, in this case, can be situated in an axial plane. However, the frusto-conical configuration of the example as per FIG. 1 could be used also here. The conical, concavely or convexly contoured surface 12 will be similar to the one of like designation in FIG. 1.

The annulus 13' is shorter than in the embodiment of FIG. 1 (or the distance between stop surface 10' and the end of threading section 3 is larger). However, a bulge 13'a on annulus 13' has the analogous sealing function as far as cooperation with surface 12 is concerned. Annulus 13' has an axial shoulder 9' which extends parallel to shoulder 10'.

An elastic sealing annulus 24 is provided having a generally sleeve-like portion 24a, which is inserted in the undercut and recess 11. That sleeve portion 24a is slightly thicker than the radial dimension of undercut 11 so that the former is firmly held and clamped in the latter. The sealing ring 24 should not drop out of the recess or be stripped off accidentally. The annular sealing element 24 has a flange portion 24b, which is interposed between the axial front end shoulder 9' of annulus 13', and surface and shoulder 10' of box member 1.

Upon assembly pin member 2 is inserted into box member 1. Since the section 4 is longer than section 3, the portion of pin member 2 and here particularly its threading for section 4, is already centered, thereby centering the sealing ring 24 in relation to the surface portions 12, 10' of box member 1, before the ring 24 reaches this zone or even is by itself inserted in box member 1. This way, any danger of stripping and forcing sealing ring 24 out of its seat is averted.

The two casing members 1, 2 are proportioned so that the bulging portion 13'a engages surface 12 before any further threading is impeded. As a consequence, ring 13' is forced radially inwardly so that portion 24a of the sealing ring is compressed which prevents any escape of flange portion 24b, when being clamped between stop surfaces 9' and 10' under relative turning as between these surfaces pursuant to relative turning of box and pin members. Further tightening of the threaded connection compresses the flange 24b to ensure tight sealing. Since the sealing ring 24 is made of a material that is less strong than the casing members themselves ring 24 compensates any tolerances in the relative axial dimensions and relations of the shoulder 5, 7, 9', 10'. The end of threading is determined by abutment of stop surfaces 5 and 7, whose abutment establishes that limit when the joint is made up.

Sealing is established in this joint in a three fold manner. There are the two metal-to-metal seals 6/8 and 13a/12 and the sealing ring 24. The latter ring is preferably made of an oil-proof plastic.

The invention is not limited to the embodiments described above, but all changes and modifications thereof not constituting departures from the spirit and scope of the invention are intended to be included.

We claim:
1. In a joint between a pin tubing or casing member and a box casing member in oil filed equipment or the like, wherein each of the members has two, axially spaced threaded portions for threaded engagement with the respective two threaded portions of the respective other member, a radial step defining transition zone between the two threaded portions for the two members, comprising:
   an annulus of one of said members extending axially between the two threaded portions of the one member, leaving a radial recess between the annulus and a portion of the one member as continuing into one of the threaded portions, the annulus having a radially outwardly bulging surface portion and an axial end face, the other one of the members having a non-complementary surface portion in the step zone, but ahead of a radial step proper of said other member in said zone for metallic engagement with said bulging surface portion of the annulus, the bulging portion rolling on said non-complementary surface portion upon engagement, the other member further having a complementary face serving with said axial end face as thread stop.

2. A joint as in claim 1, wherein said end faces are of frusto-conical configuration, each having a generatrix having the same angle to the axes of the members, the angle being from 60° to 80°, the faces having orientation so that the frusto-cone of the end face of the annulus has overall concave contour.

3. A joint as in claim 2, wherein the pin member has an end face at its ends, the box member having a complementary end face for engaging the end face of the pin member as second thread stop.

4. A joint as in claim 3, wherein the faces on the other member are farther apart axially than the faces of the member having the annulus, so that the end face on the annulus engages the respective complementary face prior to engagement of the other faces of the box and pin members.

5. A joint as in claim 1, wherein the pin member has an end face at its ends, the box member having a complementary end face for engaging the end face of the pin member as second thread stop.

6. A joint as in claim 5, wherein the faces on the other member are farther apart axially than the faces of the member having the annulus, so that the end face on the annulus engages the respective complementary face prior to engagement of the other faces of the box and pin members.

7. A joint as in claim 1, wherein the one threaded portion located between the step zone and the inner end of the pin member is larger than the other one of the threaded portion.

* * * * *